Patented Aug. 19, 1947

2,425,721

UNITED STATES PATENT OFFICE 2,425,721

THIOPHENE COMPOUNDS AND METHODS OF OBTAINING THE SAME

Frederick F. Blicke, Ann Arbor, Mich., assignor to The Regents of the University of Michigan, Ann Arbor, Mich., a body corporate of Michigan No Drawing. Application August 6, 1945, Serial No. 609,334

15 Claims. (Cl. 260—293)

This invention relates to new thiophene compounds and methods for obtaining the same.

The heterocyclic carbon-sulfur ring system of thiophene and substituted thiophenes is known to be relatively unstable chemically in comparison with the analogous non-heterocyclic carbocyclic organic compounds. In spite of this instability I have found that thiophene compounds of the general formula,

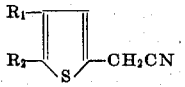

where $R_1$ is a member of the class consisting of hydrogen and —$CH_3$ and $R_2$ is a member of the class consisting of hydrogen, chlorine, bromine, iodine and alkyl radicals of 1 to 6 carbon atoms, can be reacted with [di($\beta$-halogen alkyl)] amines of the general formula

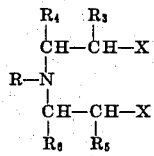

where R is a member of the class consisting of hydrogen and alkyl radicals of 1 to 6 carbon atoms, $R_3$, $R_4$, $R_5$, and $R_6$ represent the same or different members of the class consisting of hydrogen and alkyl radicals of 1 to 6 carbon atoms and X represents a halogen atom selected from the class consisting of chlorine and bromine, in the presence of an alkaline condensing agent to yield valuable and useful thiophene compounds having the formula,

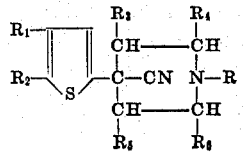

I have found that the above reaction proceeds smoothly and in good yields when it is carried out in an inert organic solvent such as benzene, toluene, xylene, di-n-propyl ether, di-n-butyl ether and the like.

The alkaline condensing agents which I use to effect the condensation between the [di-($\beta$-halogenalkyl)] amines and the various 2-cyanomethylthiophene compounds are strongly alkaline condensing agents such as alkali metal amides.

The new 2-[4'-(4'-cyanopiperidyl)] thiophene compounds of the present invention are alkaline in nature and form well-defined acid addition salts with organic or inorganic acids such as hydrochloric acid, hydrobromic acid, hydroiodic acid, sulfuric acid, nitric acid, phosphoric acid, acetic acid, sulfamic acid, lactic acid, tartaric acid, gluconic acid, malic acid, maleic acid, benzoic acid, phthalic acid, salicylic acid, succinic acid, fumaric acid and the like acids.

These new compounds are useful therapeutic agents themselves but they are even more useful as intermediates for the preparation of new and potent medicinals. For example, these nitriles may be converted to their corresponding acids by hydrolysis or to their esters by alcoholysis. These esters, which are very valuable therapeutic agents, may also be prepared by esterification of the acids obtained by hydrolysis of the nitriles or by the reaction of the acid chlorides of the acids with the appropriate alcohols. The new nitriles of the present invention may also be converted to the corresponding amides by partial hydrolysis and to the corresponding amines by catalytic reduction. The amides may also be prepared from the corresponding acid, acid chloride or ester by reaction with ammonia or an appropriate primary or secondary amine. An unusual and characteristic reaction of the new compounds of the present invention is the formation of the corresponding 2-[4'-piperidyl] thiophenes on treatment with sodium in alcohol. These transformations starting with the nitrile may be illustrated as follows:

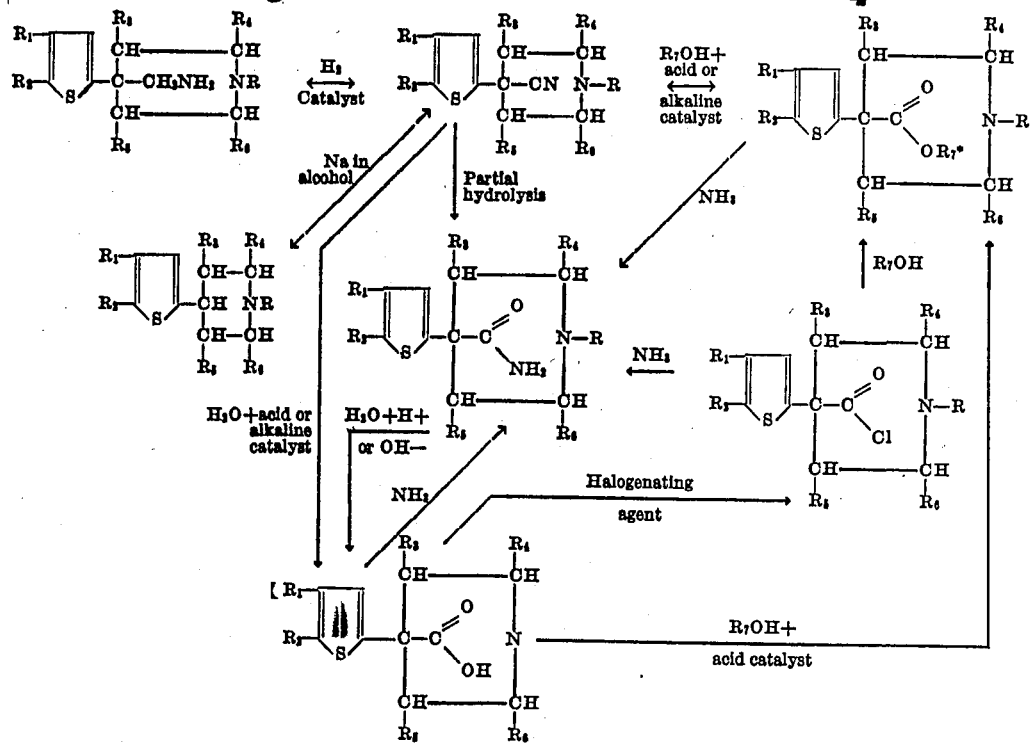

*$R_7$ is a monovalent substituted or unsubstituted hydrocarbon radical.

The 2-cyanomethylthiophenes used as intermediates in the preparation of the new thiophene compounds of the invention are prepared by treating the corresponding 2-chloromethylthiophene compound with an alkali metal cyanide in an analogous manner to the method described by Blicke and Zienty, J. Am. Chem. Soc., 63, 2945 (1941) for the preparation of 2-cyanomethylthiophene. The required 2-chloromethylthiophenes can be prepared by chloromethylation of the corresponding thiophene compound in a similar manner to that described by Blicke and Burckhalter, J. Am. Chem. Soc., 64, 478 (1942) for the preparation of 2-chloromethylthiophene from thiophene.

The intermediate [di-($\beta$-haloalkyl)] amines are prepared from the corresponding [di($\beta$-hydroxyalkyl)] amines by known methods. Some of these amino alcohols are commercially available while the others may be conveniently prepared by the reaction of the appropriate alkylene oxides or alkyl halohydrins with a primary alkyl amine.

The invention is illustrated by the following examples:

*Example 1.*—2-[4'-(1'-methyl-4'-cyanopiperidyl)]thiophene

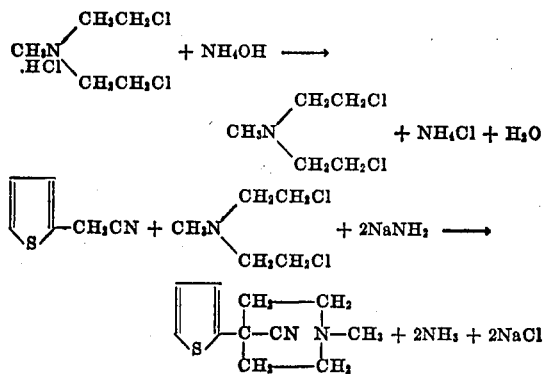

100 g. (0.52 mole) of [di-($\beta$-chloroethyl)]-methylamine hydrochloride [prepared as described by Blicke and Zienty, J. Am. Chem. Soc. 61, 772 (1939)] is dissolved in 200 ml. of water, the solution cooled in an ice bath, stirred and excess ammonium hydroxide added at such a rate that the temperature of the mixture does not rise above 30° C. The oily base which precipitates is extracted with 100 ml. of toluene and the extract dried over stick sodium hydroxide.

61.5 g. (0.5 mole) of $\alpha$-thienylmethyl cyanide [prepared according to the method described by Blicke and Zienty, J. Am. Chem. Soc., 63, 2945 (1941)] dissolved in 100 ml. of toluene is added dropwise to a suspension of 58.5 g. (1.5 moles) of sodium amide in 500 ml. of toluene at such a rate that the temperature does not rise above 10° C. The filtered dry toluene solution of [di-($\beta$-chloroethyl)]methylamine is then added slowly to mixture keeping the temperature below 5° C. After the addition is complete, cooling is discontinued. The temperature of the mixture rises to about 50° C. and ammonia is evolved. After stirring for about two hours the evolution of ammonia ceases. The mixture is refluxed for two hours which causes the evolution of more ammonia. The mixture is cooled and poured onto 500 g. of ice which causes the separation of an insoluble black gum. The mixture is heated on a steam bath until the black gum disappears, the layers partitioned and the aqueous layer discarded. Water is added to the toluene solution causing a water insoluble black oil to separate. This black oil is removed and dissolved in chloroform. The chloroform solution containing the black oil and the toluene layer are combined and the solvents removed by distillation. The residual black gum is extracted with hot ether, the ether extracts combined and the ether distilled. The residue is fractionated to yield the desired 2 - [4' - (1' - methyl-4'-cyanopiperidyl)]

thiophene as an almost colorless oil; B. P. 145-7° C./2 mm.

The hydrochloride is prepared by dissolving the base in dry ether and treating the solution with dry hydrogen chloride. The hydrochloride which separates in crystalline form is collected and recrystallized from absolute ethanol-ether mixture; M. P. 187-8° C.

*Example 2.—2-[4'-(1'-methyl-4'-cyanopiperidyl)]-5-bromothiophene*

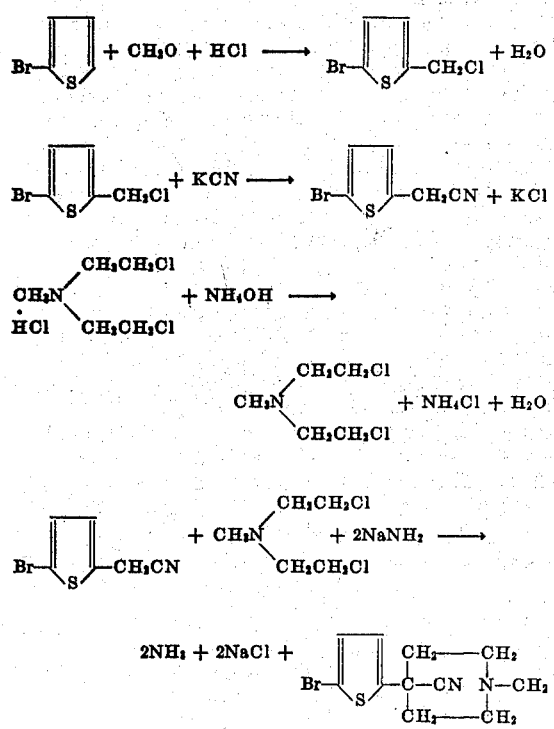

A mixture consisting of 175 ml. of concentrated hydrochloric acid, 150 ml. of 37% aqueous formaldehyde and 150 ml. of petroleum ether is cooled to 5° C. and then 326 g. (2 moles) of 2-bromothiophene is added. A rapid stream of hydrogen chloride is passed through the rapidly stirred solution keeping the temperature below 10° C. After the mixture is saturated, the aqueous phase is separated and extracted with two 50 ml. portions of petroleum ether. The extract and the organic layer are combined, washed with water and dried over potassium carbonate. After removal of the drying agent by filtration and the solvent by distillation the residue is fractionated under reduced pressure to yield the pure colorless 2-chloromethyl-5-bromothiophene.

It is usually advantageous to carry out the above chloromethylation reaction in the presence of a small amount of a catalyst such as zinc chloride or stannic chloride.

A mixture consisting of 100 g. (0.473 mole) of 2-chloromethyl-5-bromothiophene, 52 g. (0.93 mole) of potassium cyanide, 100 ml. of water and 100 ml. of petroleum ether (B. P. 90-100° C.) is stirred vigorously and refluxed for four hours. The mixture is steam distilled until no more oil distills. The distillate consists of an upper petroleum ether layer, a middle aqueous layer and a lower oily organic layer. The upper layer is separated and the middle and lower layers extracted with 200 ml. of ether. The combined ether and petroleum ether solutions are dried over magnesium sulfate, the drying agent removed by filtration and the solvents distilled. The residue is fractionated under reduced pressure to yield the pure 2-cyanomethyl-5-bromothiophene. A lower boiling fraction consisting of unchanged 2-chloromethyl-5-bromothiophene is also obtained. This material may be used again for the preparation of 2-cyanomethyl-5-bromothiophene without further purification.

2-acetamido-5-bromothiophene is also obtained in small amounts by the above procedure by cooling the aqueous solution in the steam distillation flask. This product on hydrolysis with alkali yields (5-bromothienyl-2)acetic acid.

40.3 g. (0.21 mole) of [di-(β-chloroethyl)]-methylamine hydrochloride is dissolved in 100 ml. of water, the solution cooled to about 10° C. and an excess of ammonium hydroxide added with rapid stirring keeping the temperature below 30° C. The oily layer which separates is extracted with 100 ml. of toluene and the extract dried over stick sodium hydroxide.

40.4 g. (0.2 mole) of 2-cyanomethyl-5-bromothiophene dissolved in 50 ml. of toluene is added dropwise to a rapidly stirred suspension of 23.4 g. (0.6 mole) of sodium amide in 200 ml. of toluene at such a rate that the temperature does not rise above 10° C. The toluene extract containing the [di-(β-chloroethyl)]methylamine is filtered and added slowly to the reaction mixture with stirring keeping the temperature below 5° C. After the addition is complete, cooling is discontinued. The temperature of the reaction mixture rises to about 50° C. and ammonia is evolved. Stirring is continued for about two hours during which time the evolution of ammonia practically ceases. The mixture is refluxed for about two hours which causes ammonia to again be evolved. The mixture is cooled and poured onto 200 g. of ice. If a black insoluble gum separates at this point the reaction mixture is warmed on the steam cone until a homogeneous solution is obtained. The layers are separated and the aqueous layer discarded. Water is added to the toluene solution causing a water insoluble black oil to separate. The oil is removed and dissolved in chloroform. This chloroform solution and the toluene layer are combined and the solvents distilled. The residual black gum is extracted with hot ether, the ether distilled and the residue fractionated to yield the pure 2-[4'-(1'-methyl-4'-cyanopiperidyl)]-5-bromothiophene as an almost colorless oil.

The malic acid salt of 2-[4'-(1'-methyl-4'-cyanopiperidyl)]-5-bromothiophene may be prepared by dissolving 15 g. of the pure base in a minimum amount of absolute ethanol and adding to this solution a solution of 7.05 g. of malic acid in absolute ethanol. The malic acid salt of the 2-[4'-(1'-methyl-4'-cyanopiperidyl)]thiophene is precipitated by the addition of dry ether. The white salt is collected and recrystallized from absolute ethanol-ether mixture.

*Example 3.—2-[4'-(1'-methyl-4'-cyanopiperidyl)]-4,5-dimethylthiophene*

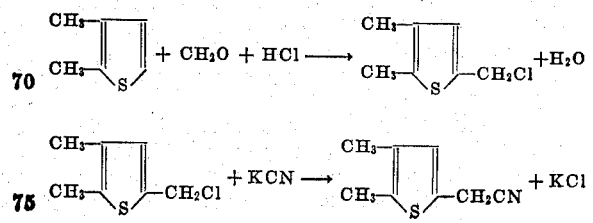

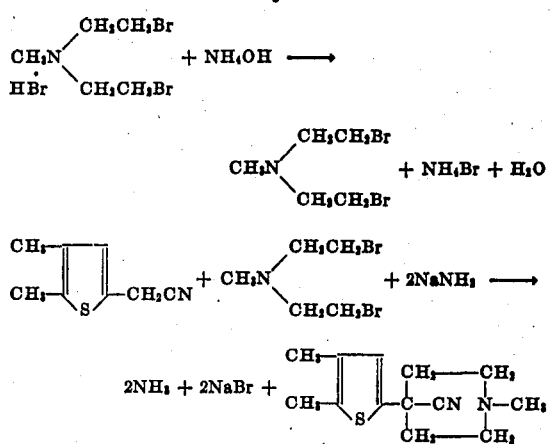

A mixture consisting of 175 ml. of concentrated hydrochloric acid, 150 ml. of 37% aqueous formaldehyde and 150 ml. of petroleum ether is cooled to 5° C. and then 224 g. (2 moles) of 2,3-dimethylthiophene is added. A rapid stream of hydrogen chloride is passed through the rapidly stirred solution keeping the temperature below 10° C. After the mixture is saturated with hydrogen chloride, the aqueous phase is separated and extracted with two 50 ml. portions of petroleum ether. The extracts and the organic layer are combined, washed with water and dried over potassium carbonate. The drying agent is removed by filtration and the solvent evaporated from the filtrate. On fractionation of the residue under reduced pressure the pure 2-chloromethyl-4,5-dimethylthiophene is obtained as a colorless liquid.

A mixture consisting of 160.5 g. (1 mole) of 2-chloromethyl-4,5-dimethylthiophene, 110 g. (1.7 mole) of potassium cyanide, 150 ml. of water and 150 ml. of petroleum ether (B. P. 90–100° C.) is stirred vigorously and refluxed for four hours. The mixture is steam distilled until no more oil distills. The distillate which consists of three phases is partitioned and the oily organic and aqueous phases extracted with 200 ml. of ether. The ether and the petroleum ether solutions are combined, dried over magnesium sulfate and the drying agent removed by filtration. The solvents are distilled from the filtrate and the residue fractioned under reduced pressure to obtain the pure 2-cyanomethyl-4,5-dimethylthiophene. A portion of the 2-chloromethyl-4,5-dimethylthiophene which boils at a lower temperature than the desired product is recovered. This recovered material may be used again in the preparation of the nitrile.

104 g. (0.32 mole) of [di-(β-bromoethyl)]methylamine hydrobromide [prepared according to the method of Prelog and Stepan, Collection Czechoslov. Chem. Communications, 7, 93–102 (1935)] is dissolved in 200 ml. of water. The solution is cooled to about 5° C. and excess ammonium hydroxide added with rapid stirring keeping the temperature below 20° C. The oily layer which separates is extracted with 100 ml. of toluene and the solution dried as rapidly as possible over anhydrous potassium carbonate. The drying agent is removed by filtration and the filtrate used immediately for the next step in the process.

45.3 g. (0.3 mole) of 2-cyanomethyl-4,5-dimethylthiophene dissolved in 75 ml. of toluene is added dropwise to a rapidly stirred suspension of 35.1 g. (0.9 mole) of sodium amide in 300 ml. of toluene at such a rate that the temperature does not rise above 10° C. The toluene solution of [di-(β-bromoethyl)]methylamine is then added dropwise with stirring at such a rate that the temperature does not rise above 5° C. After the addition of the bromo compound is complete cooling is discontinued and the reaction mixture stirred for two hours. The temperature of the reaction mixture which rises rapidly on discontinuance of cooling of the reaction mixture should be kept below about 50° C. to prevent excessive tar formation. The reaction mixture is then refluxed for two hours, cooled and poured onto 300 g. of ice. The insoluble tar which separates at this point is dissolved by warming the mixture on the steam cone. The layers are separated and the aqueous solution discarded. The toluene phase is extracted with several portions of dilute hydrochloric acid and the combined aqueous extracts made alkaline in the cold with ammonium hydroxide. The crude product is extracted with ether, the ether extracts combined and dried over potassium carbonate. The drying agent is removed by filtration and the ether distilled. The residue is fractionated under reduced pressure to yield the clear colorless 2-[4'-(1'-methyl-4'-cyanopiperidyl)]-4,5-dimethylthiophene.

The hydriodide salt is prepared by dissolving 10 g. of the base in a small quantity of absolute ethanol and adding to the resultant solution an excess absolute ethanol solution of hydrogen iodide. The salt is precipitated by the addition of anhydrous ether, collected and recrystallized from absolute ethanol-ether mixture.

*Example 4.*—*2-[4'-(1'-ethyl-4(-cyanopiperidyl)]-5-methylthiophene*

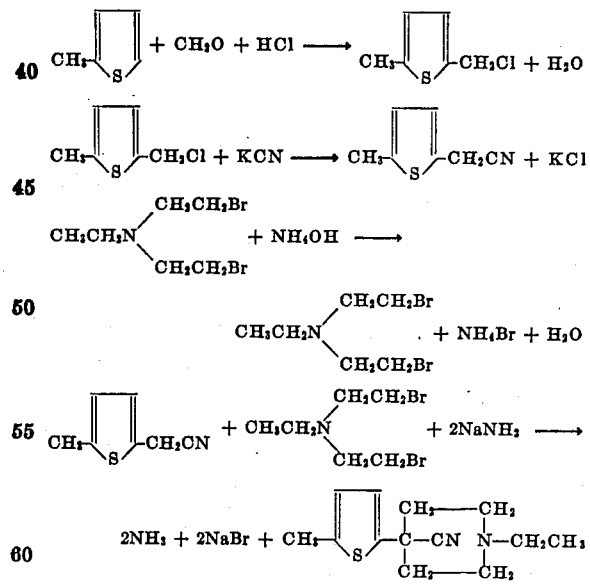

A mixture consisting of 350 ml. of concentrated hydrochloric acid, 300 ml. of 37% aqueous formalin and 300 ml. of petroleum ether (B. P. 30–60° C.) is cooled to 5° C. and then 294 g. (3 moles) of 2-methylthiophene added. A rapid stream of hydrogen chloride is passed through the rapidly stirred mixture keeping the temperature below 10° C. After the mixture is saturated with hydrogen chloride the aqueous phase is separated and extracted with two 75 ml. portions of petroleum ether. The combined petroleum ether solutions are washed with water and dried over potassium carbonate. The drying agent is removed by filtration and the solvent by distillation. On fractionation of the residue under reduced pressure the pure 2-chloromethyl-5-methylthiophene is obtained as a colorless liquid.

146.5 g. (1 mole) of 2-chloromethyl-5-methylthiophene, 99 g. (1.5 mole) of potassium cyanide, 200 ml. of water and 200 ml. of petroleum ether (B. P. 90–100° C.) is vigorously stirred and refluxed for four hours. The mixture is then steam distilled until no more oil is present in the condensate. The distillate which consists of the upper petroleum ether layer, an aqueous layer and an oily organic layer is partitioned and the aqueous phase and the oily organic layer extracted with 400 ml. of ether. The ether extracts and petroleum ether solution are combined and dried over magnesium sulfate. The drying agent is removed by filtration and the solvents distilled. The residue is fractionally distilled under reduced pressure to obtain the pure colorless 2-cyanomethyl-5-methylthiophene. A portion of the 2-chloromethyl-5-methylthiophene used as a starting material is recovered as the low boiling fraction on distillation of the product. This intermediate may be stored in the cold and used again in the preparation of the nitrile.

109 g. (0.32 mole) of [di-(β-bromoethyl)]ethylamine hydrobromide is dissolved in 350 ml. of water and the solution cooled to 5° C. An excess of ammonium hydroxide is added with stirring keeping the temperature below 20° C. The oily base which separates is extracted with 80 ml. of toluene and the extracted dried as quickly as possible over anhydrous potassium carbonate. The drying agent is removed by filtration and the filtrate containing the [di-(β-bromoethyl)]ethylamine used immediately in the next step.

45.6 g. (0.3 mole) of 2-cyanomethyl-5-methylthiophene dissolved in 80 ml. of toluene is added dropwise to a rapidly stirred suspension of 35.1 g. (0.9 mole) of sodium amide in 300 ml. of toluene keeping the temperature below 10° C. The toluene solution of [di-(β-bromoethyl)]ethylamine is then added dropwise with stirring to the reaction mixture while maintaining the temperature below 5° C. After the addition of the amine is complete the cooling bath is removed and the temperature of the reaction mixture rises to about 50° C. The mixture is stirred for about two hours during which time a considerable amount of ammonia is evolved. The mixture is then refluxed for about two hours, cooled and poured onto 300 g. of ice. The layers are separated and the aqueous phase discarded. If an insoluble tar forms at this point the mixture should be warmed on the steam bath until it dissolves before separation of the layers. The toluene layer is treated with water which causes an insoluble black oil to separate. The oil is dissolved in chloroform and the solution combined with the toluene layer. The solution is dried over magnesium sulfate, the drying agent removed by filtration and the solvents distilled. The black residue is extracted with hot ether and the ether removed from the combined extracts by distillation. The residue is fractionated under reduced pressure to obtain the pure water-white 2-[4'-(1'-ethyl-4-cyanopiperidyl)]-5-methylthiophene.

The salicylate salt of 2-[4'-(1'-ethyl-4'-cyanopiperidyl)]-5-methylthiophene is prepared by dissolving 15 g. of the pure freshly distilled base in absolute ethanol and adding an absolute ethanol solution of 9.4 g. of salicylic acid. The resulting mixture is evaporated to dryness in a stream of warm air or preferably under reduced pressure to obtain the white crystalline salt which is purified by washing with anhydrous ether. If desired, the salt may be purified further by recrystallization but for most purposes this is not necessary.

By substituting 3-methylthiophene for 2-methylthiophene as the starting material in the above process 2-[4'(1' - ethyl - 4' - cyanopiperidyl)]-4-methylthiophene is obtained.

*Example 5.*—2 - [4'-(1'-ethyl-3',5'-dimethyl-4'-cyanopiperidyl)]-4-methyl - 5 - isopropylthiophene

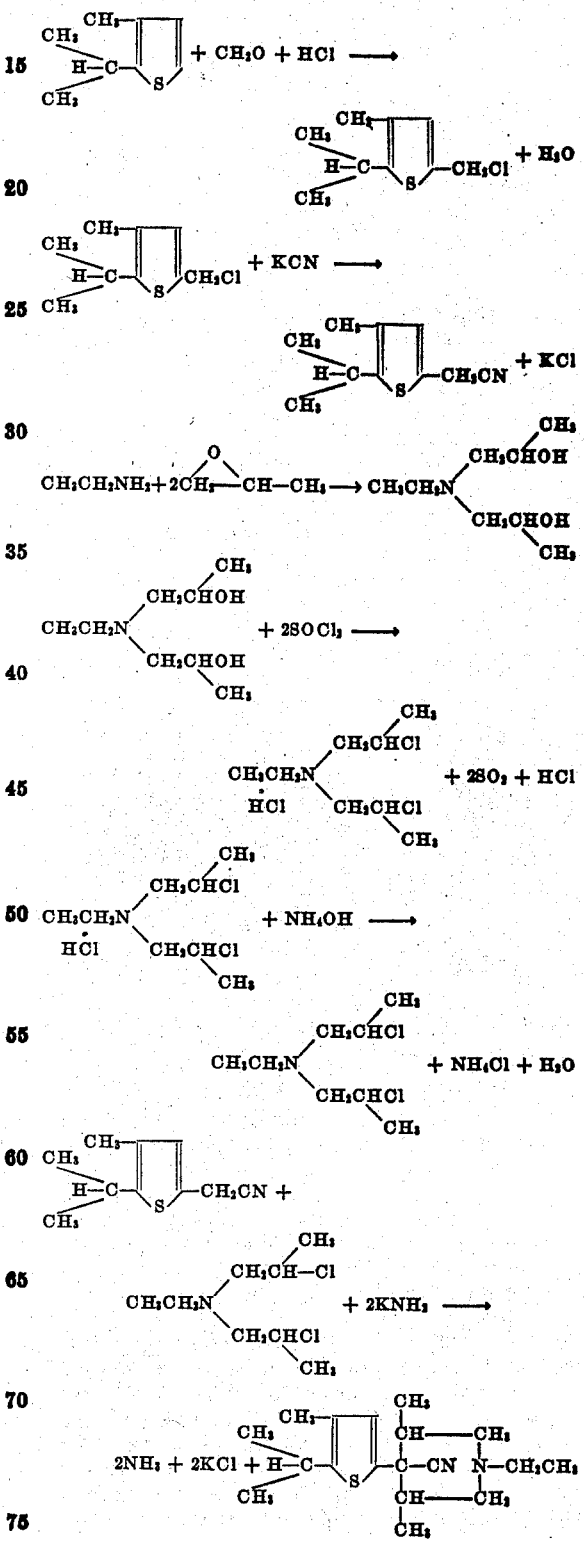

A mixture consisting of 88 ml. of concentrated hydrochloric acid, 75 ml. of 37% aqueous formaldehyde and 75 ml. of petroleum ether is cooled to 5° C. and then 140 g. (1 mole) of 2-iso-propyl-3-methylthiophene is added. The 2-iso-propyl-3-methylthiophene may be obtained by the Wurtz reaction of 2-bromo-3-methylthiophene with isopropyl bromide. A rapid stream of hydrogen chloride is passed through the rapidly stirred solution keeping the temperature below 10° C. After the mixture is saturated, the aqueous phase is removed and extracted with two 50 ml. portions of petroleum ether. The petroleum ether extracts and the organic layer of the reaction mixture are combined, washed with water and dried over potassium carbonate. The drying agent is removed by filtration and the petroleum ether by distillation. The residue is fractionally distilled under reduced pressure to obtain the pure 2-chloromethyl-4-methyl-5-iso-propylthiophene.

100 g. (0.53 mole) of 2-chloromethyl-4-methyl-5-iso-propylthiophene, 50 g. (0.89 mole) of potassium cyanide, 100 ml. of water and 100 ml. of petroleum ether (B. P. 90–100° C.) is stirred vigorously and refluxed for four hours. The condenser is set for distillation and the reaction mixture steam distilled until no oil is present in the distillate. The distillate consists of three phases, petroleum ether phase, an aqueous phase and an oily organic phase. The aqueous phase and the oily organic phase are extracted with 200 ml. of ether and the combined ether and petroleum ether extracts dried over magnesium sulfate. The drying agent is removed by filtration and the solvents removed by distillation. Fractionation of the residue under reduced pressure yields some unchanged 2-chloromethyl-4-methyl-5-iso-propylthiophene as well as the desired pure 2-cyanomethyl-4-methyl-5-iso-propylthiophene.

249.4 g. (4.3 moles) of 2,3-propylene oxide (B. P. 35° C.) is added dropwise to a rapidly stirred solution of 90 g. (2 moles) of ethylamine in 350 ml. of benzene keeping the temperature below 30° C. After the addition is complete the mixture is stirred for an additional three hours. The benzene is distilled and the residue fractionated under reduced pressure. The pure [di-(β-hydroxypropyl)]ethylamine is obtained as a yellowish colored viscous oil. [mono-(β-hydroxypropyl)]ethylamine is also obtained as a by-product in this reaction.

167 g. (0.93 mole) of [di-(β-hydroxypropyl)] ethylamine is dissolved in 250 ml. of chloroform and the solution cooled in an ice bath while 350 g. (2.85 moles) of pure thionyl chloride is dropped slowly into the solution. After the addition is complete the reaction mixture is refluxed for one and one-half hours, cooled and the precipitated hydrochloride removed by filtration and washed well with anhydrous ether. The salt is freed from thionyl chloride by drying in vacuo and then recrystallizing it from absolute ethanol-ether mixture. In general, the unrecrystallized product is sufficiently pure for use in the next step of the process.

95.7 g. (0.52 mole) of [di-(β-chloropropyl)]-ethylamine hydrochloride is dissolved in 200 ml. of water and the solution cooled to 10° C. An excess of ammonium hydroxide is added to the rapidly stirred solution keeping the temperature below 20° C. The oily base which separates is extracted with 100 ml. of toluene, the extract dried over potassium carbonate and the mixture filtered to remove the drying agent. The filtrate which contains the [di-(β-chloropropyl)]ethylamine should be used immediately in the preparation of the thiophene derivative.

89.5 g. (0.5 mole) of 2-cyanomethyl-4-methyl-5-iso-propylthiophene dissolved in 100 ml. of toluene is added dropwise to a suspension of 82.5 g. (1.5 mole) of potassium amide in 500 ml. of toluene keeping the temperature below 10° C. The toluene solution of [di-(β-chloropropyl)]-ethylamine is added to the reaction mixture with rapid stirring maintaining the temperature below 5° C. After the addition is complete cooling is discontinued and the temperature of the reaction mixture rises to about 50° C. Stirring is continued for about two hours and then the mixture is refluxed for two hours, cooled and poured onto 500 g. of ice. If a black gum separates at this point the mixture is warmed on the steam bath until solution takes places. The mixture is cooled and the layers separated. The toluene layer is extracted with several portions of dilute hydrochloric acid and the combined aqueous extracts made alkaline in the cold with ammonium hydroxide. The crude product is extracted with ether, the extracts dried over magnesium sulfate and the drying agent removed by filtration. The ether is distilled and the residue distilled under reduced pressure to yield the pure 2-[4'-(1'-ethyl-3',5' - dimethyl - 4' - cyanopiperidyl)]4-methyl-5-iso-propylthiophene.

*Example 6.—2-[4'-(1'-ethyl-3'-methyl-4'-cyanopiperidyl)]-5-n-butylthiophene*

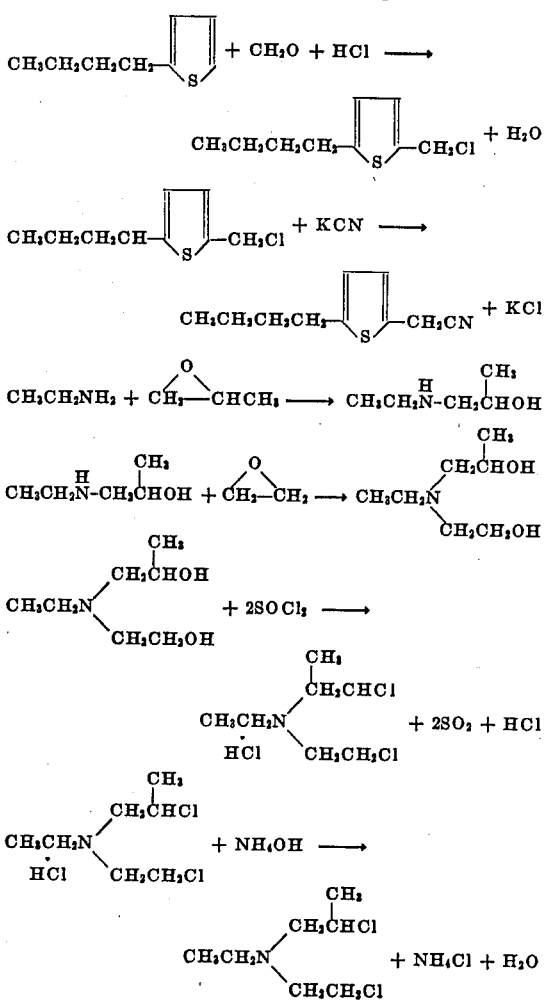

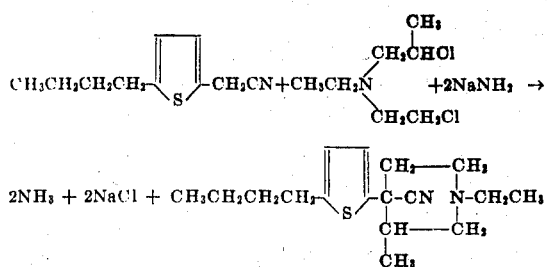

A mixture consisting of 88 ml. of concentrated hydrochloric acid, 75 ml. of 37% aqueous formaldehyde and 75 ml. of petroleum ether is cooled to 5° C. and then 140 g. (1 mole) of 2-n-butylthiophene is added. A rapid stream of hydrogen chloride is passed through the rapidly stirred solution keeping the temperature below 10° C. After the mixture is saturated, the aqueous phase is separated and extracted with two 50 ml. portions of petroleum ether. The extracts and the organic layer are combined, washed with water and dried over potassium carbonate. The drying agent is removed by filtration and the petroleum ether distilled. The residue is fractionated under reduced pressure to obtain the pure colorless 2-chloromethyl-5-n-butylthiophene.

A mixture consisting of 75.5 g. (0.4 mole) of 2-chloromethyl-5-n-butylthiophene, 52 g. (0.8 mole) of potassium cyanide, 100 ml. of water and 100 ml. of petroleum ether (B. P. 90–100° C.) is stirred vigorously and refluxed for four hours. The mixture is steam distilled until no more oil is present in the condensate. The distillate consists of an upper petroleum ether layer, an aqueous layer and an oily organic layer. The aqueous layer and the oily organic layer are extracted with 200 ml. of ether and the combined ether and petroleum ether solutions dried over magnesium sulfate. The drying agent is removed by filtration and the solvents distilled. The residue is fractionated under reduced pressure to yield a low boiling fraction which consists of unchanged 2-chloromethyl-5-n-butylthiophene and a higher boiling fraction which consists of the desired 2-cyanomethyl 5-n-butylthiophene.

58 g. (1 mole) of 2,3-propylene oxide is added dropwise to a rapidly stirred solution of 90 g. (2 moles) of ethylamine in 350 ml. of benzene keeping the temperature below 30° C. After the addition is complete the mixture is stirred for an additional three hours and then the benzene and excess ethylamine distilled off. The residue is fractionated under reduced pressure to obtain the pure light yellow colored ($\beta$-hydroxypropyl)ethylamine.

Gaseous ethylene oxide is passed into a rapidly stirred solution of 75 g. (0.73 mole) of ($\beta$-hydroxypropyl)ethylamine in 200 ml. of benzene keeping the temperature below 30° C. The addition is continued until the gain in weight of the reaction mixture is 32 g. The reaction mixture is allowed to stand for three hours and then the benzene is stripped. On fractionation of the residue under reduced pressure the pure ($\beta$-hydroxyethyl) ($\beta$-hydroxypropyl)-ethylamine is obtained as a light yellow viscous oil.

100 g. (0.68 mole) of ($\beta$-hydroxyethyl) ($\beta$-hydroxypropyl)ethylamine is dissolved in 250 ml. of chloroform and the solution cooled in an ice bath while 350 g. (2.85 moles) of pure thionyl chloride is dropped slowly into the solution. After the addition is complete the reaction mixture is refluxed for one and one-half hours, cooled and the precipitated white hydrochloride salt of ($\beta$-chloroethyl) ($\beta$-chloropropyl)ethylamine removed by filtration and washed well with anhydrous ether. The salt is placed in a desiccator under reduced pressure to remove the ether and traces of thionyl chloride.

110 g. (0.5 mole) of ($\beta$-chloroethyl) ($\beta$-chloropropyl)ethylamine hydrochloride is dissolved in 300 ml. of water and the resulting solution cooled to 10° C. An excess ammonium hydroxide is then added slowly to the solution with rapid stirring keeping the temperature below 20° C. and the oily base which separates extracted with 100 ml. of toluene. The toluene extract is dried for a short time over potassium carbonate and the drying agent removed by filtration.

86 g. (0.48 mole) of 2-cyanomethyl-5-n-butyl-thiophene dissolved in 125 ml. of toluene is added dropwise to a suspension of 56.2 g. (1.44 mole) of sodamide in 500 ml. of toluene keeping the temperature below 10° C. The toluene solution of ($\beta$-chloroethyl) ($\beta$-chloropropyl)ethylamine is then added dropwise to the rapidly stirred reaction mixture keeping the temperature below 5° C. After the addition is complete, cooling is discontinued and the mixture is stirred for an additional two hours. The mixture is refluxed for two hours, cooled and extracted with several portions of 2 N hydrochloric acid. The toluene layer is discarded, the aqueous extracts are made alkaline in the cold with ammonium hydroxide and extracted with ether. The ether extracts are combined, dried over magnesium sulfate and the drying agent removed by filtration. The ether is distilled and the residue fractionated under reduced pressure to obtain the pure colorless 2-[4'-(1'-ethyl-2'-methyl-4'-cyanopiperidyl)]-5-n-butylthiophene.

The hydrochloride salt is prepared by dissolving the freshly distilled base in a small amount of absolute ethanol and adding an excess of hydrogen chloride in absolute ethanol. The salt is precipitated with dry ether, collected and recrystallized from absolute ethanol-ether mixture.

*Example 7.*—2 - [4' - (1-n-propyl-4'-cyanopiperidyl)]thiophene

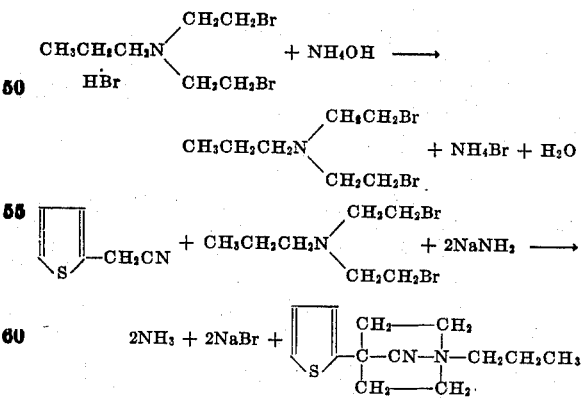

93 g. (0.26 mole) of [di-($\beta$-bromoethyl)]-n-propylamine hydrobromide [prepared as described by Prelog and Stepan, Collection Czechoslov. Chem. Communications, 7, 93–102 (1935)] is dissolved in 125 ml. of water, the solution cooled in an ice bath and excess ammonium hydroxide added with stirring at such a rate that the mixture does not rise above 30° C. The oily base which separates is extracted with 100 ml. of toluene, the extract dried over stick sodium hydroxide for a short time and the solution filtered.

30.8 g. (0.25 mole) of $\alpha$-thienylmethyl cyanide dissolved in 50 ml. of toluene is added dropwise to a suspension of 29.3 g. (0.75 mole) of sodium amide in 250 ml. of toluene at such a rate that the temperature does not rise above 10° C. The dry toluene solution of [di-(β-bromoethyl)/-n-propylamine is then added to the reaction mixture keeping the temperature below 5° C. After the addition is complete, cooling is discontinued. The temperature of the mixture rises to about 50° C. and ammonia is evolved. After stirring for about two hours the evolution of ammonia ceases. The mixture is refluxed for about two hours which causes the evolution of more ammonia. The mixture is cooled and poured onto 200 g. of ice. The aqueous phase is separated and discarded. The toluene phase is extracted with dilute hydrochloric acid and the combined aqueous extracts made alkaline in the cold with ammonium hydroxide. The crude product which separates is taken up in ether, the aqueous phase extracted with several portions of ether and the combined ether extracts dried over anhydrous potassium carbonate. The drying agent is removed by filtration and the ether distilled. The residue is fractioned under reduced pressure to yield the pure 2-[4'-(1'-n-propyl-4'-cyanopiperidyl)]thiophene as an almost colorless oil.

15 g. of freshly distilled 2-[4'-(1'-n-propyl-4'-cyanopiperidyl)]thiophene is dissolved in 100 ml. of anhydrous ether and the solution treated with dry gaseous hydrogen bromide. The hydrobromide salt which separates as a white crystalline powder is collected and recrystallized from absolute ethanol-ether mixture.

*Example 8.—2-[4'-(1'-n-propyl-2',3',5',6'-tetramethyl - 4' - cyanopiperidyl)] - 4 - methyl - 5 - chlorothiophene*

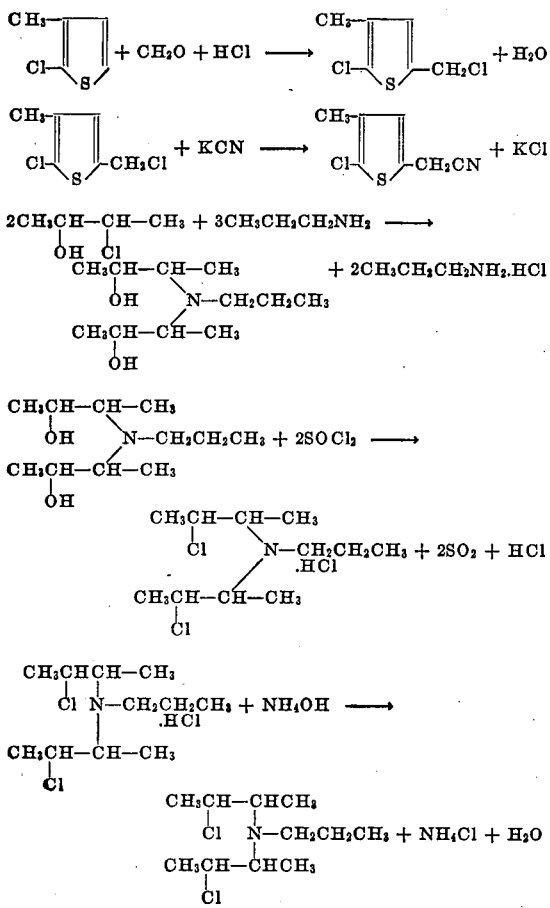

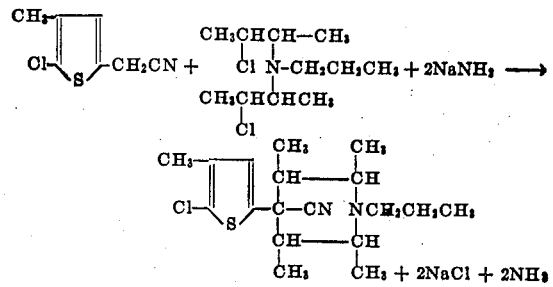

A mixture consisting of 88 ml. of concentrated hydrochloric acid, 75 ml. of 37% aqueous formaldehyde and 75 ml. of petroleum ether is cooled to 5° C. and then 132.5 g. (1 mole) of 2-chloro-3-methylthiophene added. A rapid stream of hydrogen chloride is passed through the rapidly stirred solution keeping the temperature below 10° C. After the mixture is saturated, the aqueous phase is separated and extracted with two 50 ml. portions of petroleum ether. The extracts and the petroleum ether layer are combined, washed with water and dried over potassium carbonate. The drying agent is removed by filtration and the petroleum ether distilled. The residue is fractionated under reduced pressure to yield the desired 2-chloromethyl-4-methyl-5-chlorothiophene.

A mixture consisting of 81.5 g. (0.45 mole) of 2-chloromethyl-4-methyl-5-chlorothiophene, 58.5 g. (0.9 mole) of potassium cyanide, 100 ml. of water and 100 ml. of petroleum ether (B. P. 90–100° C.) is stirred vigorously and refluxed for four hours. The condenser is set for distillation and the mixture steam distilled until no more oil is present in the condensate. The distillate which consists of three layers is partitioned and the oily organic layer and the water layer extracted with a total of 200 ml. of ether. The ether extracts and the petroleum ether layer are combined and dried over magnesium sulfate. The drying agent is removed by filtration and the solvents distilled. The residue is fractionated to yield a low boiling fraction which consists of unchanged 2-chloromethyl-4-methyl-5-chlorothiophene and a high boiling fraction which consists of the desired 2-cyanomethyl-4-methyl-5-chlorothiophene.

217 g. (2 moles) of 2-hydroxy-3-chlorobutane is added dropwise to a refluxing solution of 174 g. (3 moles) of n-propylamine in 1 liter of toluene. After all the chlorohydrin has been added the mixture is refluxed for ten hours, cooled and the n-propylamine hydrochloride removed by filtration and washed well with anhydrous ether. The ether washings and toluene filtrate are combined and the solvents removed by distillation. The residue is fractionated under reduced pressure to obtain the desired [di - (α-methyl-β-hydroxypropyl) ]-n-propylamine as a light yellowish viscous liquid.

15.5 g. (0.75 mole) of [di-(α-methyl-β-hydroxypropyl)]-n-propylamine is dissolved in 250 ml. of chloroform and the solution cooled in an ice bath while 350 g. (2.85 moles) of pure thionyl chloride is dropped slowly into the stirred solution. After the addition is complete the reaction mixture is refluxed for one and one-half hours, cooled and the precipitated hydrochloride salt of [di-(α-methyl-β-chloropropyl)]-n - propylamine removed by filtration. The crude salt is freed from thionyl chloride by placing it in a vacuum desiccator under reduced pressure.

85. g. (0.31 mole) of [di-(α-methyl-β-chloropropyl)]-n-propylamine hydrochloride salt is dissolved in 175 ml. of water and the solution cooled to 10° C. An excess of ammonium hydroxide is added to the solution keeping the temperature below 20° C. The oily base which separates is extracted with 100 ml. of toluene and the extract dried for a few minutes over potassium carbonate. The drying agent is removed by filtration and the filtrate used immediately in the next step of the process.

51.5 g. (0.3 mole) of 2-cyanomethyl-4-methyl-5-chlorothiophene dissolved in 100 ml. of toluene is added dropwise to a suspension of 35.1 g. (0.9 mole) of sodamide in 500 ml. of toluene keeping the temperature below 10° C. The toluene solution containing the [di-(α-methyl-β-chloropropyl)]-n-propylamine is then added slowly to the reaction mixture keeping the temperature below 5° C. After the addition is complete cooling is discontinued and the reaction mixture stirred for two hours. The mixture is refluxed for two hours, cooled and poured onto 500 g. of ice which causes an insoluble black gum to separate. The mixture is warmed on the steam bath until the gum dissolves, cooled and the layers separated. The aqueous solution is extracted with two 50 ml. portions of chloroform and the combined chloroform extracts and toluene solution dried over magnesium sulfate. The drying agent is removed by filtration and the solvents distilled. The residual black gum is extracted with hot ether, the residue discarded and the ether evaporated from the combined extracts. The residue is fractionated under diminished pressure to obtain the desired 2-[4'-(1'-n-propyl-2',3',5',6'-tetramethyl-4'-cyanopiperidyl)]-4-methyl-5-chlorothiophene.

*Example 9.—2-[4'-(1'-iso-propyl-3',5'-diethyl-4'-cyanopiperidyl)]-5-t-butylthiophene*

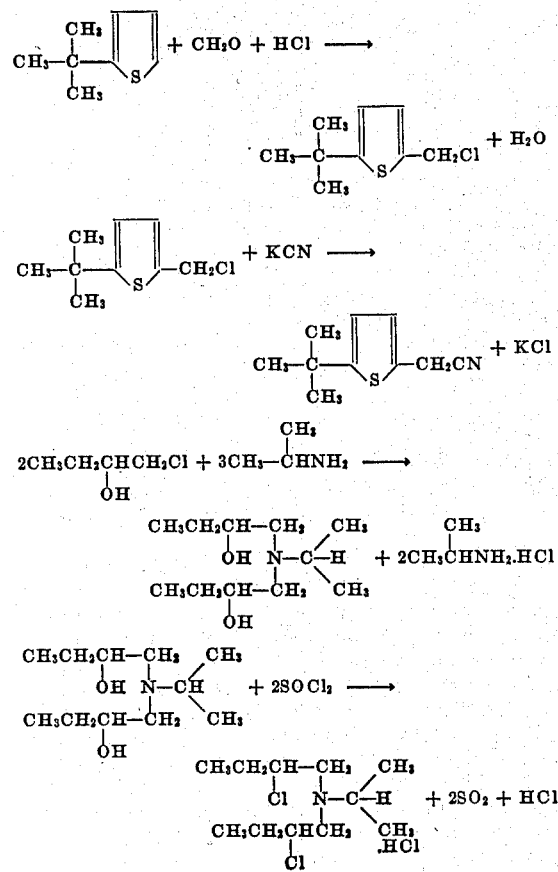

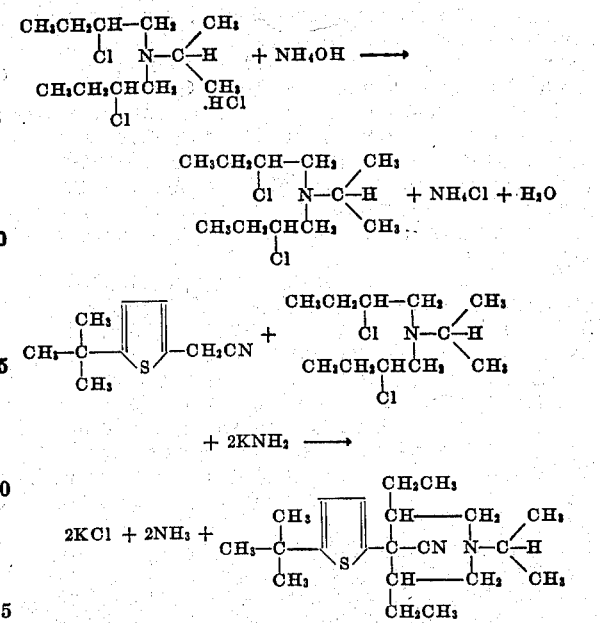

A mixture consisting of 88 ml. of concentrated hydrochloric acid, 75 ml. of 37% aqueous formaldehyde and 75 ml. of petroleum ether is cooled to 5° C. and then 142 g. (1 mole) of 2-t-butylthiophene (prepared by the Wurtz reaction of t-butyl chloride and 2-bromothiophene) added. A rapid stream of hydrogen chloride is passed through the rapidly stirred solution keeping the temperature below 10° C. After the mixture is saturated, the aqueous phase is removed and extracted with two 25 ml. portions of petroleum ether. The petroleum ether extracts and the organic layer are combined, washed with water and dried over potassium carbonate. The drying agent is removed by filtration and the solvents distilled. The residue is distilled under reduced pressure to yield the desired 2-chloromethyl-5-t-butylthiophene.

A mixture consisting of 100 g. (0.53 mole) of 2-chloromethyl-5-t-butylthiophene, 71.5 g. (1.1 mole) of potassium cyanide, 75 ml. of water and 75 ml. of petroleum ether (B. P. 90–100° C.) is stirred vigorously and refluxed for four hours. The condenser is set for distillation and the mixture steam distilled until no more oil is present in the condensate. The distillate consists of three phases, an oily organic layer, an aqueous phase and a petroleum ether layer. The phases are partitioned and the oily organic layer and the aqueous phase extracted with 200 ml. of ether. The combined ether and petroleum ether solutions are dried over magnesium sulfate, the solution filtered and the solvents distilled from the filtrate. The residue on fractionation under reduced pressure yields the pure 2-cyanomethyl-5-t-butylthiophene.

162.8 g. (1.5 moles) of 1-chlorobutanol-2 is added dropwise to a solution of 133 g. (2.25 moles) of isopropylamine in 1000 ml. of toluene with rapid stirring. The mixture is stirred for four hours at room temperature and then heated on the steam bath for twelve hours. The mixture is cooled and the precipitated hydrochloride removed by filtration and washed with ether. The ether washings and toluene filtrate are combined and the solvents distilled. The residue is distilled under reduced pressure to obtain the [di-(α-ethyl-β-hydroxyethyl)]-isopropylamine as a yellowish viscous liquid.

101.5 g. (0.5 mole) of [di-(α-ethyl-β-hydroxyethyl)]isopropylamine is dissolved in 150 ml. of chloroform and the solution cooled in an ice bath while 200 g. (1.68 mole) of thionyl chloride is added to the solution dropwise. After the addition is complete the mixture is refluxed for one and one-half hours, cooled and the yellowish white precipitated hydrochloride of [di-(α-ethyl-β-chloroethyl)]-isopropylamine removed by filtration, washed with ether and dried in a vacuum desiccator.

71.5 g. (0.26 mole) of [di-(α-ethyl-β-chloroethyl)]-isopropylamine hydrochloride is dissolved in 150 ml. of water and the solution cooled to 5° C. An excess of ammonium hydroxide is added slowly with stirring keeping the temperature below 20° C. The oily base which separates is extracted with 75 ml. of toluene and the solution dried for a few minutes over potassium carbonate. The drying agent is removed by filtration and the solution of the base used immediately in the next step.

44.7 g. (0.25 mole) of 2-cyanomethyl-5-t-butylthiophene dissolved in a small amount of toluene is added dropwise with stirring to a suspension of 41.3 g. (0.75 mole) of potassium amide in 400 ml. of toluene keeping the temperature below 10° C. After the addition is completed the toluene solution of [di-(α-ethyl-β-chloroethyl)]-isopropylamine is added dropwise with stirring keeping the temperature below 5° C. Cooling is then discontinued and the mixture stirred for two hours. The mixture is refluxed for two hours, cooled and the mixture treated with 50 ml. of water. The aqueous phase is discarded and the toluene layer extracted with dilute hydrochloric acid. The toluene phase is discarded and the aqueous extracts made alkaline in the cold with ammonium hydroxide. The mixture is extracted with several portions of ether and the combined ether extracts dried over potassium carbonate. The drying agent is removed by filtration and the ether distilled. On fractionation of the residue under reduced pressure the desired 2-[4'-(1'-isopropyl-3',5'-diethyl-4'-cyanopiperidyl)]-5-t-butylthiophene is obtained.

The maleic acid salt of the base may be prepared by mixing an absolute ethanol solution of the base with an absolute ethanol solution containing one equivalent of maleic acid. The white salt is precipitated by the addition of anhydrous ether, collected and recrystallized from absolute ethanol-ether mixture.

*Example 10.—2-[4'-(1',3'-di-iso-propyl-4'-cyanopiperidyl)]-4-methyl-5-ethylthiophene*

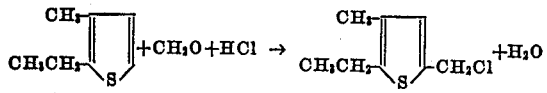

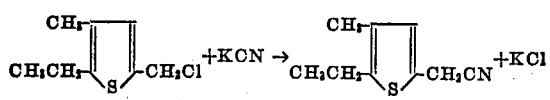

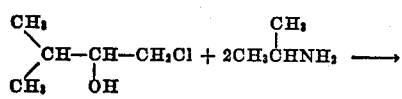

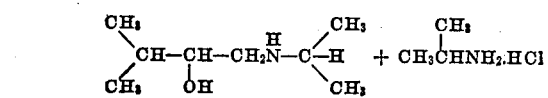

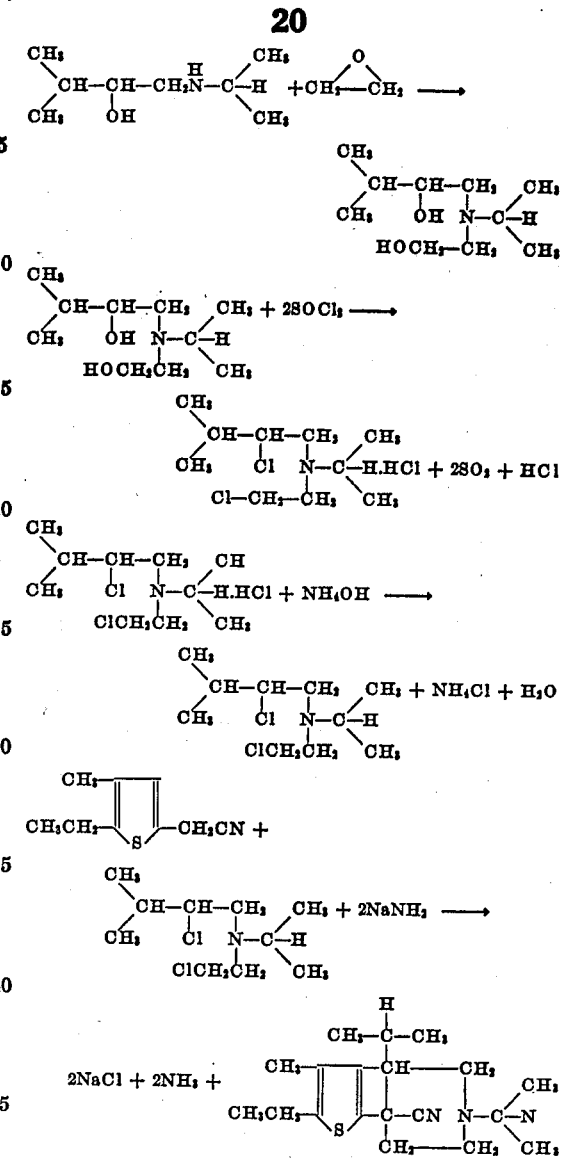

A mixture consisting of 88 ml. of concentrated hydrochloric acid, 75 ml. of 37% aqueous formaldehyde solution and 75 ml. of petroleum ether is cooled to 5° C. and then 126 g. (1 mole) of 2-ethyl-3-methylthiophene is added. A rapid stream of hydrogen chloride is passed through the vigorously stirred solution keeping the temperature below 10° C. After the mixture is saturated, the aqueous phase is removed and discarded. The petroleum ether solution is washed with water, dried over potassium carbonate and the petroleum ether distilled. The residue is fractionated under reduced pressure to obtain the 2-chloromethyl-4-methyl-5-ethylthiophene as a colorless liquid.

A mixture consisting of 104.7 g. (0.6 mole) of 2-chloromethyl-4-methyl-5-ethylthiophene, 65 g. (1 mole) of potassium cyanide, 100 ml. of water and 150 ml. of petroleum ether (B. P. 90–100° C.) is refluxed and stirred for four hours. The condenser is set for distillation and the mixture steam distilled until no more oil is present in the distilling vapors. The distillate is partitioned and the oily organic and the aqueous phases extracted with 200 ml. of ether. The combined ether extracts and petroleum ether layers are dried over magnesium sulfate, the drying agent removed by filtration and the petroleum ether distilled. The residue is distilled under reduced pressure to obtain the desired 2-cyanomethyl-4-methyl-5-ethylthiophene.

A solution of 107.5 g. (1 mole) of 1-chloro-2-hydroxy-3-methylbutane and 89 g. (1.5 mole) of isopropylamine in 500 ml. of benzene is refluxed on a steam bath overnight. The mixture is cooled, the precipitated isopropylamine hydrochloride removed by filtration and washed with ether. The benzene filtrate and the ether washings are combined and extracted with dilute hydrochloric acid. The combined aqueous extracts are made alkaline with 10 N sodium hydroxide and extracted with several portions of ether. The ether extracts are dried over potassium carbonate, the mixture filtered and the ether evaporated from the filtrate. The desired product, (β-hydroxy-γ-methylbutyl) - iso - propylamine, is obtained by distillation of the residue under reduced pressure.

Gaseous ethylene oxide is passed into a rapidly stirred solution of 109.5 g. (0.75 mole) of (β-hydroxy-γ-methylbutyl)-isopropylamine in 500 ml. of benzene keeping the temperature below 35° C. After the theoretical quantity of ethylene oxide, 33 g., has been absorbed the benzene is distilled from the mixture. The residue is fractionated under reduced pressure whereby one obtains the pure (β-hydroxy-γ-methylbutyl) (β - hydroxyethyl)-isopropylamine as a light yellow rather viscous oil.

114.6 g. (0.6 mole) of (β-hydroxy-γ-methylbutyl) (β-hydroxyethyl)-isopropylamine is dissolved in 250 ml. of chloroform and the solution cooled in an ice bath while 300 g. (2.5 moles) of pure thionyl chloride is added dropwise to the rapidly stirred solution. After the addition is complete, the mixture is refluxed for one and a half hours, cooled and 200 ml. of chloroform added. The mixture is filtered, the precipitated hydrochloride washed with ether and dried in vacuo.

100 g. (0.40 mole) of (β-chloro-γ-methylbutyl) (β-chloroethyl)-isopropylamine hydrochloride is dissolved in 200 ml. of water and the solution cooled to about 5° C. An excess of ammonium hydroxide is added to the rapidly stirred solution keeping the temperature below 20° C. The oily base which separates is extracted with 100 ml. of benzene and the solution dried for a few minutes over potassium carbonate. The drying agent is removed by filtration and the solution used immediately in the next step.

64.3 g. (0.39 mole) of 2-cyanomethyl-4-methyl-5-ethylthiophene in a small amount of benzene is added dropwise to a rapidly stirred suspension of 45.7 g. (1.17 mole) of sodamide in 400 ml. of benzene keeping the temperature below 10° C. The benzene solution of the (β-chloro-γ-methylbutyl) (β-chloroethyl)-isopropylamine is then added dropwise to the reaction mixture keeping the temperature below 5° C. After the addition is complete cooling is discontinued and the mixture is stirred for two hours. The mixture is then refluxed for four hours, cooled and poured onto 200 g. of ice. If a black tar separates at this point the solution is warmed on the steam cone until the tar dissolves. The aqueous phase is discarded and the benzene layer extracted with dilute hydrochloric acid. The aqueous extracts are made alkaline in the cold with ammonium hydroxide and the mixture extracted with several portions of ether. The ether extracts are dried over potassium carbonate, the mixture filtered and the ether distilled from the filtrate. The residue on fractionation yields the pure 2-[4'-(1',3'-di-isopropyl-4'-cyanopiperidyl)]-4- methyl - 5 - ethylthiophene.

*Example 11.—2-[4'-(1'-n-butyl-4'-cyanopiperidyl)]-thiophene*

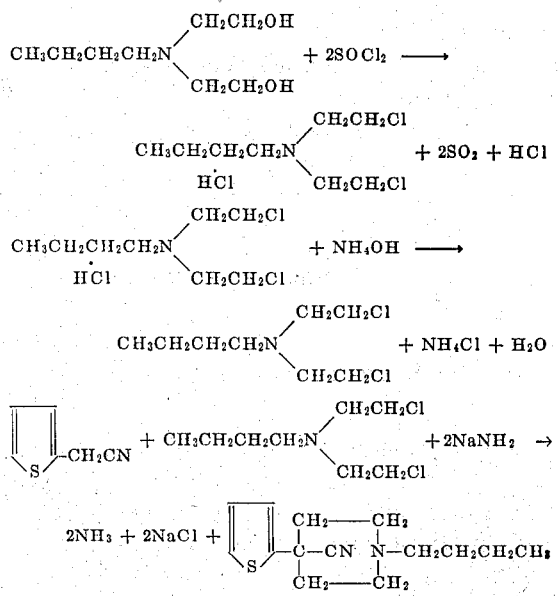

A solution of 161 g. (1 mole) of [di-(β-hydroxyethyl)]-n-butylamine (prepared from n-butylamine and ethylene oxide) in 500 ml. of chloroform is cooled in an ice bath and 600 g. (5.04 moles) of pure thionyl chloride added dropwise with rapid stirring. After the addition is complete the mixture is refluxed for two hours, cooled, and the precipitated hydrochloride of [di-(β-chloroethyl)]-n-butylamine removed by filtration, washed with ether and dried in a desiccator under reduced pressure.

121.7 g. (0.52 mole) of [di-(β-chloroethyl)]-n-butylamine hydrochloride is dissolved in 250 ml. of water and the solution cooled to about 10° C. An excess of ammonium hydroxide is added to the rapidly stirred solution keeping the temperature below 25° C. The oily base which separates is extracted with 100 ml. of xylene, the extract dried with stick sodium hydroxide, filtered and used immediately in the next step.

61.5 g. (0.5 mole of 2-cyanomethylthiophene dissolved in 100 ml. of xylene is added dropwise to a rapidly stirred suspension of 58.5 g. (1.5 moles) of sodium amide in 500 ml. of xylene keeping the temperature below 10° C. Cooling is discontinued, the mixture stirred for two hours and then refluxed for two hours. The mixture is cooled and poured onto 500 g. of ice. A black tar separates at this point is dissolved by heating the mixture on the steam cone. The mixture is cooled and the aqueous phase extracted with 200 ml. of chloroform. The combined xylene and chloroform solutions are dried over potassium carbonate, filtered and the solvent distilled. The residue is extracted with hot ether, and the ether evaporated from the extract. The residue from the ether extract on distillation under reduced pressure yields the desired 2-[4'-(1'-n-butyl-4'-cyanopiperidyl)]-thiophene as an almost colorless oil.

The hydrochloride salt may be prepared by dissolving the base in anhydrous ether and bubbling an excess of dry hydrogen chloride into the solution. The salt which may separate as an oil is washed with several portions of dry ether and crystallized from absolute ethanol-ether mixture.

*Example 12.—2-[4'-(1'-n-butyl-3'-t-butyl-4'-cyanopiperidyl)]-thiophene*

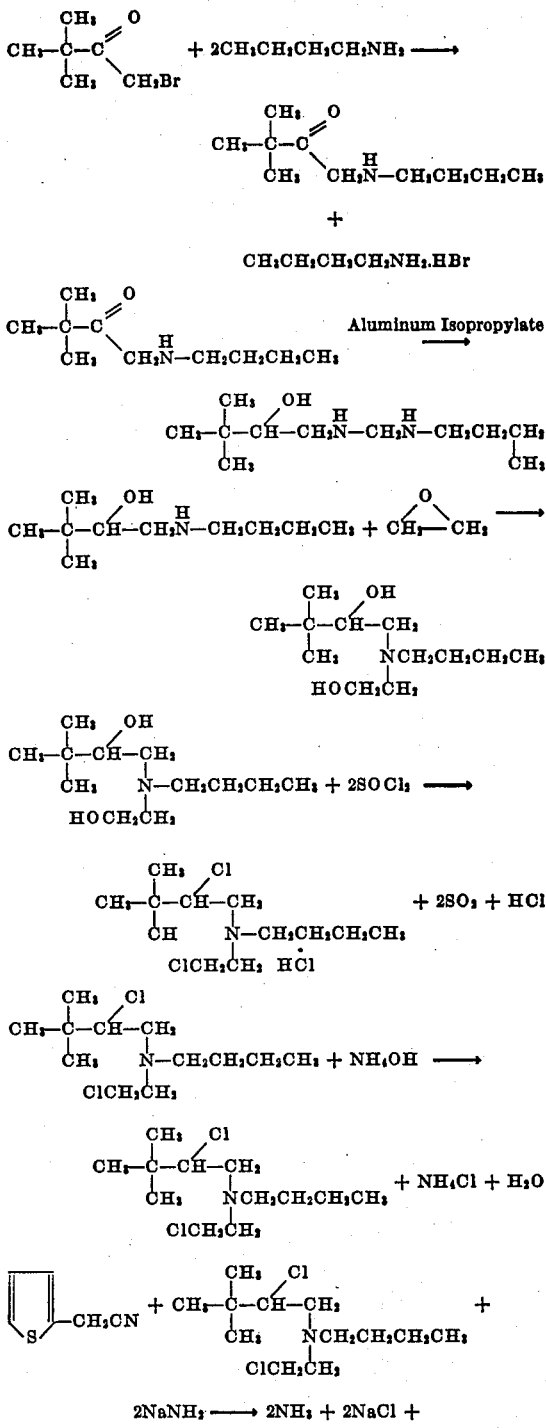

92 g. (0.36 mole) of (β-chloro-γ,γ-dimethylbutyl) (β-chloroethyl) n-butylamine hydrochloride (prepared as indicated above from t-butyl bromomethyl ketone, n-butylamine and ethylene oxide) is dissolved in 150 ml. of water and the solution cooled to about 5° C. Excess ammonium hydroxide is added to the rapidly stirred solution keeping the temperature below 20° C. The oily base which separates is extracted with 100 ml. of toluene and the extract dried for a few minutes over potassium carbonate. The drying agent is removed by filtration and the toluene solution of the base used immediately in the next step.

A solution of 43 g. (0.35 mole) of 2-cyanomethylthiophene in 75 ml. of toluene is added dropwise to a rapidly stirred suspension of 41 g. (1.05 moles) of sodium amide in 400 ml. of toluene keeping the temperature below 10° C. The toluene solution of (β-chloro-γ,γ-dimethylbutyl) (β-chloroethyl)-n-butylamine is then added dropwise to the reaction mixture keeping the temperature below 5° C. After the addition is complete, cooling is discontinued and the mixture is stirred for two hours. The reaction mixture is refluxed for two hours, cooled, and treated with 100 ml. of ice water. The aqueous solution is extracted with 75 ml. of water and discarded. The ether and toluene solutions are combined and extracted with dilute hydrochloric acid. The aqueous extracts are made alkaline in the cold with ammonium hydroxide and the mixture extracted with ether. The combined ether extracts are dried over potassium carbonate, filtered and the ether distilled. The residue is fractionated under reduced pressure to obtain the desired 2-[4'-(1'-n-butyl-3'-t-butyl-4'-cyanopiperidyl)]-thiophene.

*Example 13.—2-[4'-(1'-n-amyl-3'-n-butyl-4'-cyano-5'-methyl-piperidyl)]-5-iodothiophene*

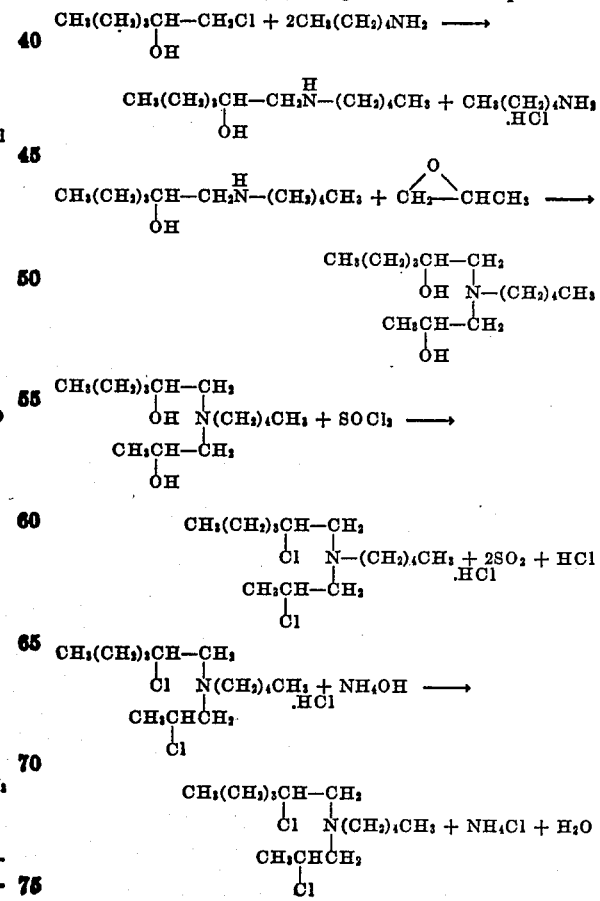

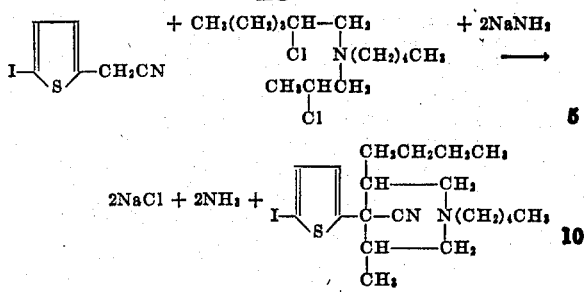

95.5 g. (0.3 mole) of (β-chloro-n-hexyl) (β-chloropropyl)-n-amylamine hydrochloride (prepared as indicated above from 1-chloro-2-hydroxyhexane, n-amylamine and 2,3-propylene oxide) is dissolved in 150 ml. of water and the solution cooled to 5° C. Excess ammonium hydroxide is added with stirring keeping the temperature below 20° C. The oily base which separates is extracted with 100 ml. of di-n-butyl ether, the extract dried over potassium carbonate for a few minutes, the solution filtered and used immediately in the next step.

71 g. (0.29 mole) of 2-cyanomethyl-5-iodothiophene (prepared in an analogous manner to 2-cyanomethyl-5-bromothiophene described in Example 3) dissolved in 75 ml. of di-n-butyl ether is added to a rapidly stirred suspension of 34 g. (0.39 mole) of sodium amide in 300 ml. of di-n-butyl ether keeping the temperature below 5° C. After the addition is complete cooling is discontinued and the mixture stirred for two hours, cooled and 100 ml. of water added. The aqueous phase is discarded and the butyl ether layer extracted with dilute hydrochloric acid. The aqueous extracts are made alkaline in the cold with ammonium hydroxide and the mixture extracted with several portions of ether. The ether extracts are dried over potassium carbonate, filtered and the ether distilled. The residue is fractionated under reduced pressure to obtain the desired 2-[4'-(1'-n-amyl-3'-n-butyl-4'-cyano-5'-methylpiperidyl)]-5-iodothiophene.

I claim:

1. A compound of the class consisting of a free base and its acid addition salts, said free base having the following formula,

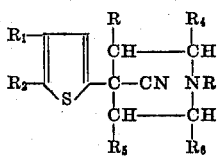

where R is a member of the class consisting of hydrogen and alkyl radicals of 1 to 6 carbon atoms, $R_1$ is a member of the class consisting of hydrogen and —$CH_3$, $R_2$ is a member of the class consisting of hydrogen, chlorine, bromine, iodine, and alkyl radicals of 1 to 6 carbon atoms and $R_3$, $R_4$, $R_5$, and $R_6$ represent members of the class consisting of hydrogen and alkyl radicals of 1 to 6 carbon atoms.

2. A compound of the class consisting of a free base and its acid addition salts, said free base having the formula,

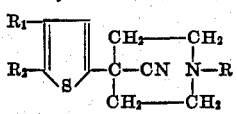

where R is a member of the class consisting of hydrogen and alkyl radicals of 1 to 6 carbon atoms, $R_1$ is a member of the class consisting of hydrogen and —$CH_3$ and $R_2$ is a member of the class consisting of hydrogen, chlorine, bromine, iodine, and alkyl radicals of 1 to 6 carbon atoms.

3. A compound of the class consisting of a free base and its acid addition salts, said free base having the following formula,

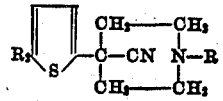

where R is a member of the class consisting of hydrogen and alkyl radicals of 1 to 6 carbon atoms and $R_2$ is a member of the class consisting of hydrogen, chlorine, bromine, iodine and alkyl radicals of 1 to 6 carbon atoms.

4. A compound of the class consisting of a free base and its acid addition salts, said free base having the following formula,

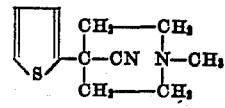

5. A compound of the class consisting of a free base and its acid addition salts, said free base having the following formula,

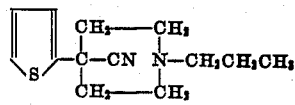

6. A compound of the class consisting of a free base and its acid addition salts, said free base having the following formula,

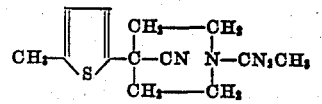

7. A compound having the formula,

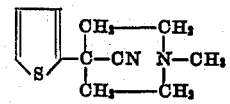

8. A compound having the formula,

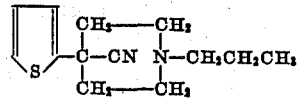

9. A compound having the formula,

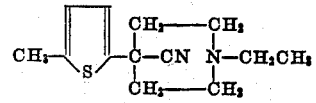

10. Process for preparing a compound having the formula,

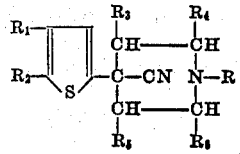

which comprises condensing a compound having the formula,

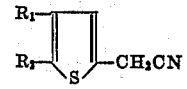

with a [di-(β-halogenalkyl)] amine of the formula

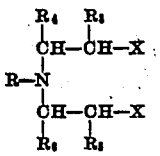

in an inert organic solvent in the presence of an alkaline condensing agent, when R is a member of the class consisting of hydrogen and alkyl radicals of 1 to 6 carbon atoms, $R_1$ is a member of the class consisting of hydrogen, and —$CH_3$, $R_2$ is a member of the class consisting of hydrogen, chlorine, bromine, iodine and alkyl radicals of 1 to 6 carbon atoms, $R_3$, $R_4$, $R_5$ and $R_6$ represent members of the class consisting of hydrogen and alkyl radicals of 1 to 6 carbon atoms and X represents a halogen atom selected from the class consisting of chlorine and bromine.

11. Process for preparing a compound having the formula,

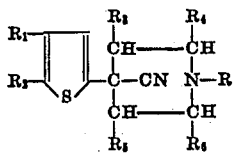

which comprises condensing a compound having the formula,

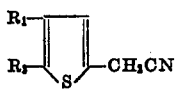

with a [di-(β-halogenalkyl)] amine of the formula

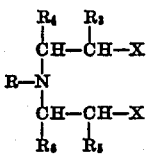

in an inert organic solvent in the presence of an alkali metal amide, where R is a member of the class consisting of hydrogen and alkyl radicals of 1 to 6 carbon atoms, $R_1$ is a member of the class consisting of hydrogen and —$CH_3$, $R_2$ is a member of the class consisting of hydrogen, chlorine, bromine, iodine and alkyl radicals of 1 to 6 carbon atoms, $R_3$, $R_4$, $R_5$ and $R_6$ represent members of the class consisting of hydrogen and alkyl radicals of 1 to 6 carbon atoms and X represents a halogen atom selected from the class consisting of chlorine and bromine.

12. Process for preparing a compound having the formula,

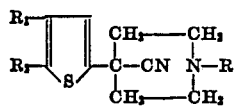

which comprises condensing a compound having the formula,

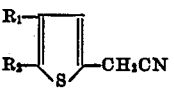

with a [di-β-halogenalkyl)] amine of the formula,

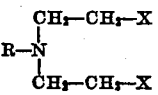

in an inert organic solvent in the presence of an alkaline condensing agent, where R is a member of the class consisting of hydrogen and alkyl radicals of 1 to 6 carbon atoms, $R_1$ is a member of the class consisting of hydrogen and —$CH_3$, $R_2$ is a member of the class consisting of hydrogen, chlorine, bromine, iodine and alkyl radicals of 1 to 6 carbon atoms and X represents a halogen atom selected from the class consisting of chlorine and bromine.

13. Process for preparing a compound having the formula,

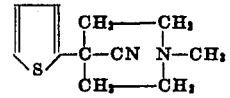

which comprises condensing a compound having the formula,

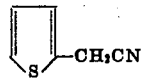

with a [di-(β-halogenethyl)] methyl amine of the formula,

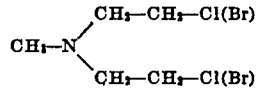

in an inert organic solvent in the presence of an alkaline condensing agent.

14. Process for preparing a compound having the formula,

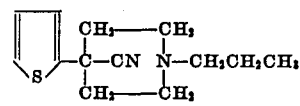

which comprises condensing a compound having the formula,

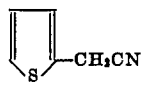

with a [di-(β-halogenethyl)]-n-propylamine of the formula,

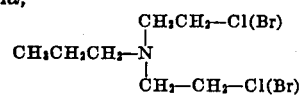

in an inert organic solvent in the presence of an alkaline condensing agent.

15. Process for preparing a compound having the formula,

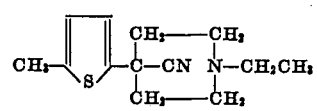

which comprises condensing a compound having the formula,

with a [di-(β-halogenethyl)] ethylamine of the formula,

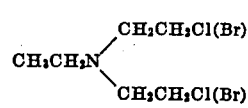

in an inert organic solvent in the presence of an alkaline condensing agent.

FREDERICK F. BLICKE.